US012704192B2

(12) United States Patent
Pendleton et al.

(10) Patent No.: US 12,704,192 B2
(45) Date of Patent: Aug. 11, 2026

(54) FLUID END USING CARTRIDGE CHECK VALVE AND WEDGE RETENTION SYSTEM

(71) Applicant: GARTECH, LLC, Houston, TX (US)

(72) Inventors: Gary Pendleton, Shotley Bridge (GB); Gary Warren Stratulate, Houston, TX (US)

(73) Assignee: Gartech LLC, Houston, TX (US)

( * ) Notice: Subject to any disclaimer, the term of this patent is extended or adjusted under 35 U.S.C. 154(b) by 160 days.

(21) Appl. No.: 17/337,572

(22) Filed: Jun. 3, 2021

(65) Prior Publication Data

US 2022/0390031 A1 Dec. 8, 2022

(51) Int. Cl.
*F16K 27/02* (2006.01)
*F16K 15/02* (2006.01)
*F16L 41/03* (2006.01)

(52) U.S. Cl.
CPC ........ *F16K 27/0209* (2013.01); *F16K 15/026* (2013.01); *F16L 41/03* (2013.01)

(58) Field of Classification Search
CPC .... F16K 27/0209; F16K 15/026; F16L 41/03; F16L 37/123; F16L 37/15
See application file for complete search history.

(56) References Cited

U.S. PATENT DOCUMENTS 2,882,925 A 4/1959 Smolensky
4,141,676 A * 2/1979 Jannen .................... F04B 1/02 417/539
4,573,886 A * 3/1986 Maasberg ............... F04B 53/10 417/454
5,145,340 A * 9/1992 Allard ...................... F16J 15/26 277/584
6,910,871 B1 * 6/2005 Blume .................. F04B 53/007 417/454
7,681,589 B2 * 3/2010 Schwegman ........... F16K 15/18 137/543.13
8,601,687 B2 * 12/2013 Ochoa ..................... F04B 53/14 248/639
9,739,130 B2 * 8/2017 Young ................... F04B 53/007
2003/0089403 A1 5/2003 Duncan et al.
2007/0193633 A1 * 8/2007 Howell ................. F16K 15/063 137/542
2013/0306167 A1 * 11/2013 Sisk .................... F16K 27/0209 137/540.11
2014/0271266 A1 * 9/2014 Young ..................... F04B 53/14 417/360
2019/0040966 A1 * 2/2019 Myers ................... F16K 15/026
2019/0145400 A1 5/2019 Graham et al.
2019/0264683 A1 * 8/2019 Smith .................. F04B 1/0538
2021/0270382 A1 * 9/2021 Sherbeck ................ F04B 53/10

OTHER PUBLICATIONS

Office Action Summary for U.S. Appl. No. 17/520,061 dated Sep. 18, 2023. PDF file. 8 pages.
Office Action Summary for U.S. Appl. No. 17/520,061 dated Sep. 28, 2022. PDF file. 9 pages.

* cited by examiner

*Primary Examiner* — Reinaldo Sanchez-Medina
*Assistant Examiner* — Nicole Gardner
(74) *Attorney, Agent, or Firm* — C. Tumey Law Group PLLC

(57) ABSTRACT

Embodiments presented provide for a fluid end that has cartridge style check valves that may be serviced through a vertical bore.

17 Claims, 10 Drawing Sheets

FLUID END USING CARTRIDGE CHECK VALVE AND WEDGE RETENTION SYSTEM

CROSS-REFERENCE TO RELATED APPLICATIONS

None.

FIELD OF THE DISCLOSURE

Aspects of the disclosure relate to fluid ends. More specifically, aspects of the disclosure relate to a sacrificial portion that connects to fluid end devices to enable the fluid end device to withstand service pressures and flows for long periods.

BACKGROUND

Fluid end assemblies are used extensively with industrial pumps, well service pumps, well fracturing pumps, and drilling pump units, used within the oil & gas industry predominantly, to pressurize a fluid prior to the fluids use in oil well construction and production.

Fluid ends are generally mono or multi block style and are connected to a reciprocating pumping mechanism. The reciprocating mechanism being a crank slider mechanism to which is attached a piston/plunger. A typical conventional fluid end is illustrated in FIG. 1. As the piston moves forward in conjunction with the fluid end, fluid is forcibly moved within the fluid end discharging out of the fluid end via an upper check valve. Similarly, on the back stroke of the piston fluid is drawn into the fluid end through a lower check valve assembly filling the fluid end void, ready for its discharge in the forward stroke.

Within the main fluid end block, the internal profiles are generated to locate the relevant components. The check valve elements are of particular note, in that the fluid end is profiled vertically with a complex geometry to successfully locate the valve seats and the valve construction made of a number of elements—springs, location clips, valve, The vertical bore is then sealed with a plug and screwed nut to close the unit for pressure tightness.

The upper and lower check valves have a valve seat (which needs to be accurately located within the fluid end body) and various clips and springs to effect the operation of the valves. Typically the upper check valve is assembled through the top of the fluid end, with the lower check valve assembled from the side through the horizontal plug bore. Typical conventional valve components are illustrated in FIG. 2. Such valve components are prone to wear, fatigue and breakable during extended service life.

Check valves are considered as a consumable product and as such need regular maintenance and replacement. This maintenance and replacement can be problematic due to access constraints (small components fitting into relatively small bores). Success of a valve set is influenced as to how well the valve set is assembled to prevent wash-out (a term related to the erosion of components by the fluid passing through the fluid end). Further components can become seized within the bores adding to the problematic maintenance of the valves. Should the valve seats become seized, for example, heavy hydraulic equipment is required to extract the stuck seat, Consequently, downtime for an operation pump can be quickly accumulated, something the operators wish to minimize as much as possible.

Following a successful replacement of the valves, the bores are sealed with a combination of plug and screwed nut. Due to the size of the screwed nut and the pressure it is working against, considerable torque is required to tighten the nut. There are types of nuts which can utilize hydraulic tightening devices; there is still substantial use of the 'hammer nut' style screwed nut. As the name suggests this nut is hammered tight, resulting in variability of the tightening (and therefore sealing), It is known that these nuts can release gradually due to the pulsating effect of the internal pressure resulting in failure of the seals and potential damage to the valves, resulting in further maintenance requirements.

There is a need to provide a system that has a superior check valve construction compared to conventional units.

There is a further need to provide a system that alleviates the drawbacks of hammered nut designs currently used in conventional apparatus.

There is a further need to provide a system that allows a fluid end to have superior operational and fatigue life for operational personnel.

There is a further need to provide a system with the above attributes while being inexpensive to manufacture as well as maintain.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an arrangement is disclosed. The arrangement may comprise a block configured with at least one bore. The arrangement may also comprise at least a first check valve, and a second check valve inserted into the at least one bore. The arrangement may also comprise a cross piece positioned in at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block. The arrangement may also comprise a wedge retaining system configured to interface with the block and wherein a bottom of the wedge retaining system is configured to interface with the seal.

In another embodiment, a cartridge check valve is disclosed. The cartridge check valve may comprise an outer body defining an inner volume. The cartridge check valve may also comprise an outlet configured to interface with at least a portion of the outer body. The cartridge check valve may also comprise a seal configured to interface with the outlet. The cartridge check valve may also comprise a guide stem. The cartridge check valve may also comprise a center core configured within the inner volume of the outer body. The cartridge check valve may also comprise a spring configured to interface with the center core and a valve end configured to interface with the spring; wherein upon a predefined pressure and pressures greater than the predefined pressure, the valve end is configured to move within the center core creating a fluid pathway and wherein the guide stem is configured to extend from the valve end to the center core.

In another embodiment, an arrangement is disclosed. The arrangement may comprise a block configured with at least one bore. The arrangement may also comprise at least a first check valve and a second check valve inserted into the at least one bore. The arrangement may also comprise a cross piece positioned in the at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block and a wedge retaining system configured to interface with the block. The arrangement may also be configured wherein a bottom of the wedge retaining system is configured to interface with the seal and wherein at least one of the first check valve and the second check valve comprise an outer body defining an inner volume. The arrangement may also be configured with an outlet configured to interface with at least a portion of the outer body wherein the seal is configured to interface with the outlet. The arrangement may also comprise a guide stem and a center core configured within the inner volume of the outer body. The arrangement may also comprise a spring configured to interface with the center core and a valve end configured to interface with the spring; wherein upon a predefined pressure and pressures greater than the predefined pressure, the valve end is configured to move within the center core creating a fluid pathway and wherein the guide stem is configured to extend from the valve end to the center core.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1:
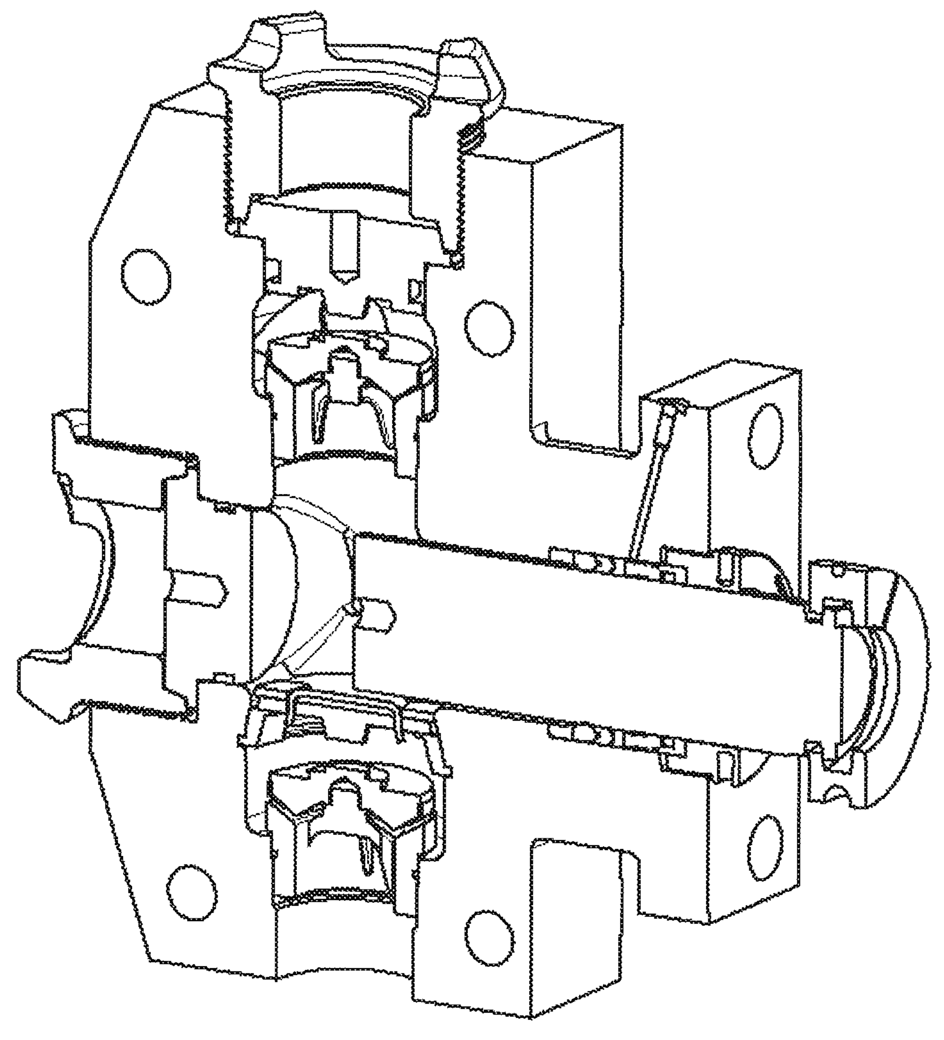
FIG. 1 is a side cross-sectional view of a conventional fluid end block and check valve system.
Figure 2:
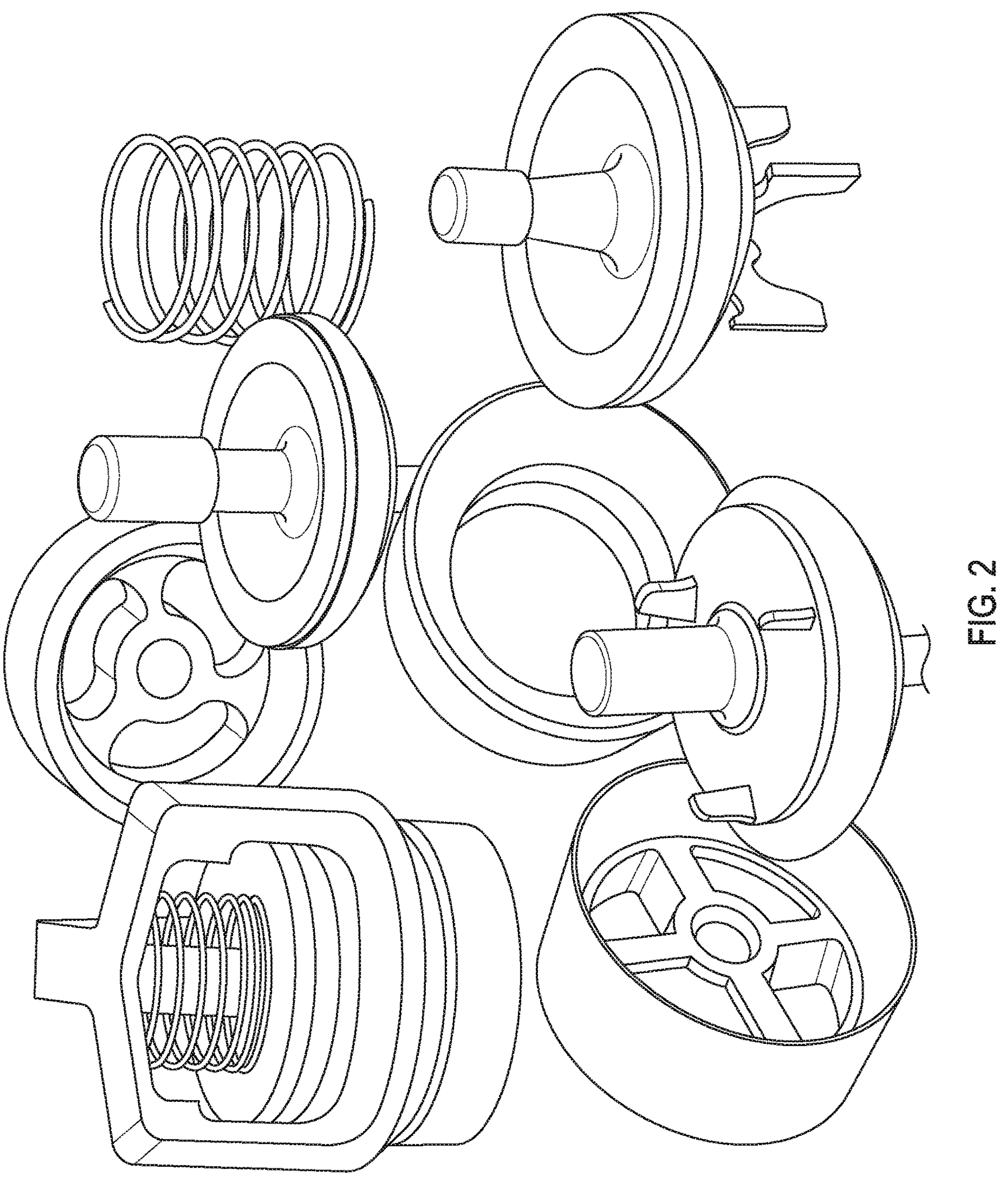
FIG. 2 is a side perspective view of conventional check valve components.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that, the disclosure is not limited to specific described embodiments, Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 3:
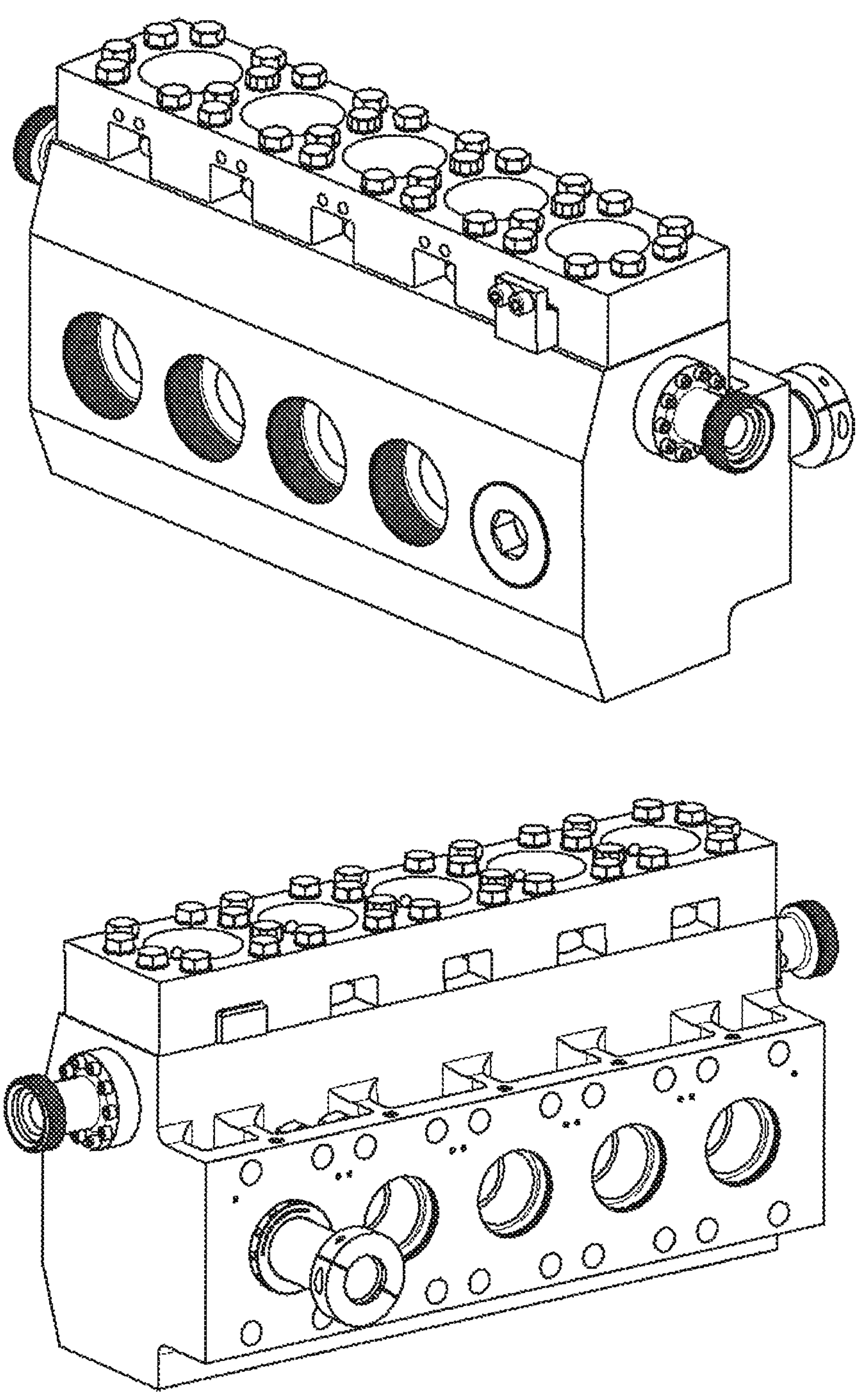
FIG. 3 is a left and right side perspective view of a fluid end block with associated piston and check valve arrangement in accordance with one example embodiment of the disclosure.

Referring to FIG. 3, a left and right perspective view of embodiments of the disclosure are illustrated. During conventional apparatus service lives, different types of difficulties arise for operations staff. Check valves may become clogged and non-operational. Leak paths may develop after repeated closing and opening of check valves. Locations of check valves are non-optimal, wherein operators must try to access check valves in designs that are not conducive to maintenance activities. Fluid ends, moreover, are subject to stress cracking due to fatigue because of small diameter at the fluid passage intersection and have expensive machining costs, thereby increasing the overall cost for operators.

Aspects of the disclosure provide for a remedy for each drawback discussed above. Check valve construction is provided in a unitary configuration, thereby allowing operators the ability to simply replace a cartridge style unit, greatly enhancing serviceability of the fluid end. The fluid end itself is designed to allow operators the ability to easily access valves from the top of the fluid end, allowing maintenance personnel the access that is needed in field locations. Aspects of the disclosure allow for maintaining a retention capability of inserted components through a component retention wedge that allows for easy installation and precise control of stresses within the fluid end.

Figure 4:
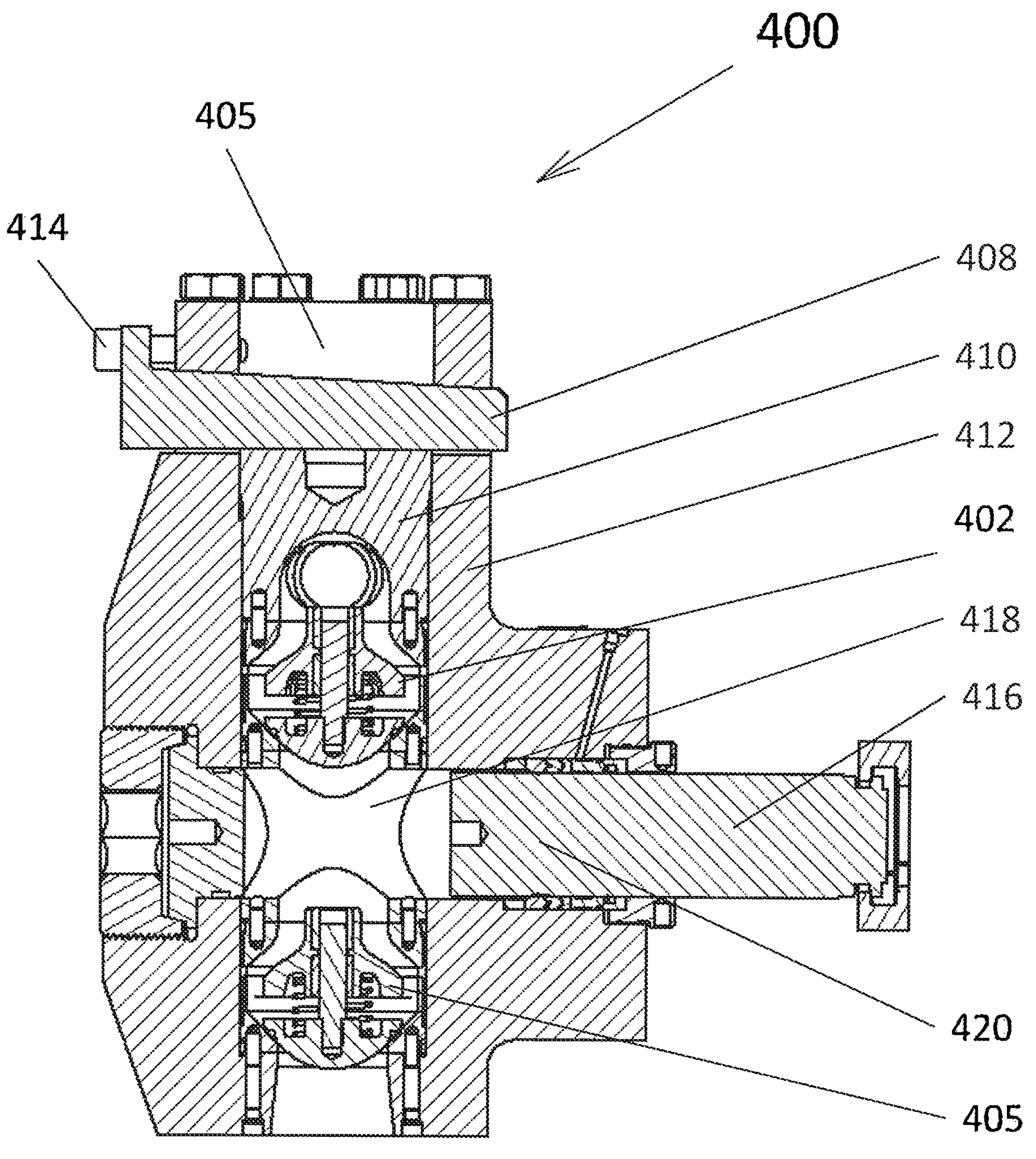
FIG. 4 is a cross-sectional view of the fluid end block of FIG. 3.

Referring to FIG. 4, a cross-sectional view of one example embodiment is illustrated. The fluid end 400 provides two check valves in the design. An upper check valve 402 and a lower check valve 404 are provided in a vertical bore 406 of the fluid end. The location of the upper check valve 402 and the lower check valve 404 in the configuration allows the valves to be maintained through a top access of the fluid end 400. Components are maintained in position through a wedge retention system 408 that retains a flow plug 410 within the fluid end block 412. The wedge retention system 408 may be secured to the fluid end block 412 through a bolted connection 414. In one example embodiment, the bolted connection 414 uses two bolts.

The upper check valve 402 and the lower check valve 404 are oriented to allow flow of fluid through a preferred direction. Each of the upper check valve 402 and the lower check valve 404 may be identical in configuration and design, as illustrated in FIG. 5, described below. As illustrated, the configuration provided in FIG. 3 may have five horizontal piston arrangement 416, therefore in this configuration, five lower check valves 404 are used as well as five upper check valves 402. As will be understood, different fluid end arrangements are possible with differing numbers of pistons, therefore alterations of the potential illustrated embodiment are possible. As provided, a cross piece 418 is provided between a horizontal bore 420 and the vertical bore 406. Such cross piece 418 allows for flow to transmit to/from the upper check valve 402 and the lower check valve 404.

Figure 5A:
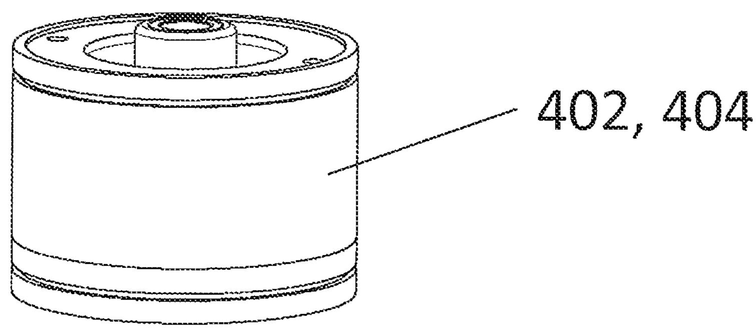
FIG. 5A is a side view of an assembled check valve used in accordance with FIG. 3.
Figure 5B:
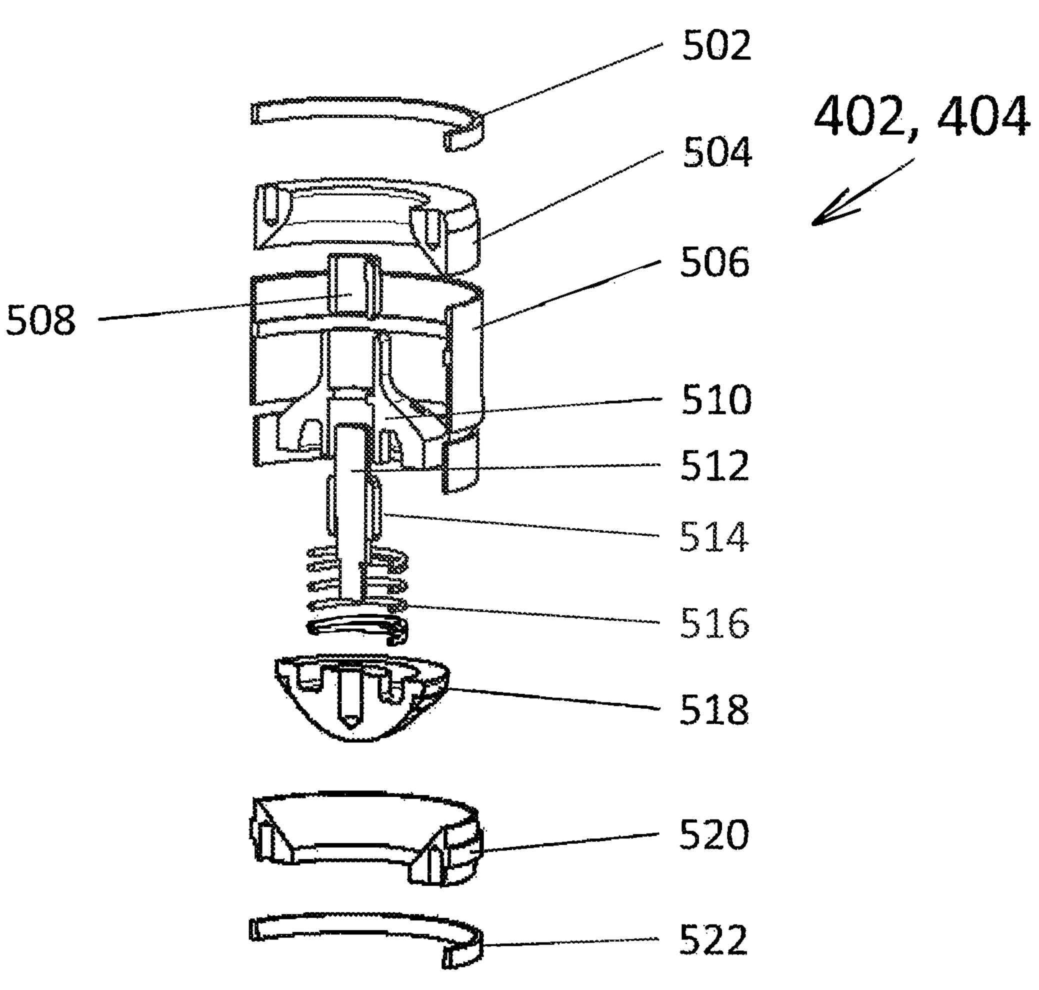
FIG. 5B is an exploded view of the check valve of FIG. 5A.

Referring to FIGS. 5A and 5B, a check valve 402, 404 is illustrated. The check valve 402, 404 may be used as the upper or lower check valve as described in relation to FIG. 4. The check valve 402, 404 is constructed as a one-piece sub assembly, i.e. all parts of the check valve 402, 404 are assembled into a single cartridge style unit. In FIG. 5A, an assembled check valve 402, 404 is illustrated. In FIG. 5B, an exploded view of the check valve 402, 404 is illustrated. The check valve 402, 404 has a seal 502, that is positioned at least partially around an outlet 504. The check valve 402, 404 further has an outer body 506 that houses bearings 508 and a center core 510. A guide stem 512 is positioned extending from the center core 510 through a bearing 514. A spring 516 provides for compression on the internal components of the check valve 402, 404. The spring 516 connects with the valve end 518. Sealing is provided between the valve end 518 and an inlet valve seat 520. A bottom seal 522 is provided to at least partially encircle the inlet valve seat 520. In embodiments, the valve end 518 may have different configurations. The valve end 518 may have a hemispherical end in one example embodiment. Other embodiments may allow for the valve end 518 to have an ellipsoid circular or semi-circular end.

During assembly, the interfacing items are a location/press fit together ensuring consistent assembly and alignment. Once assembled the press-fit make-up ensures no fluid by-pass through connecting faces, reducing potential wash-out.

Material selection of the check valve 402, 404 ensures corrosion between the fluid end 400 and the check valve 402, 404 is minimized/eliminated, so the check valve 402, 404 does not become seized.

Note the check valve 402, 404 design allows for an increased flow path, i.e. conventional fluid end machining has limited scope to open up bores to prevent flow restriction, e.g. a conventional fluid end may only have a 2⅝" bore exit for discharge, whereas with the style of check valve 402, 404 and vertical bore 406, the discharge aperture can be significantly larger, therefore reducing flow restriction and better flow dynamics.

The fluid end 400 is machined with a single vertical cylindrical bore 406, enabling the location of the cartridge style check valve 402, cross piece 418, and lower check valve 404 to locate within the bore 406.

Figure 6:
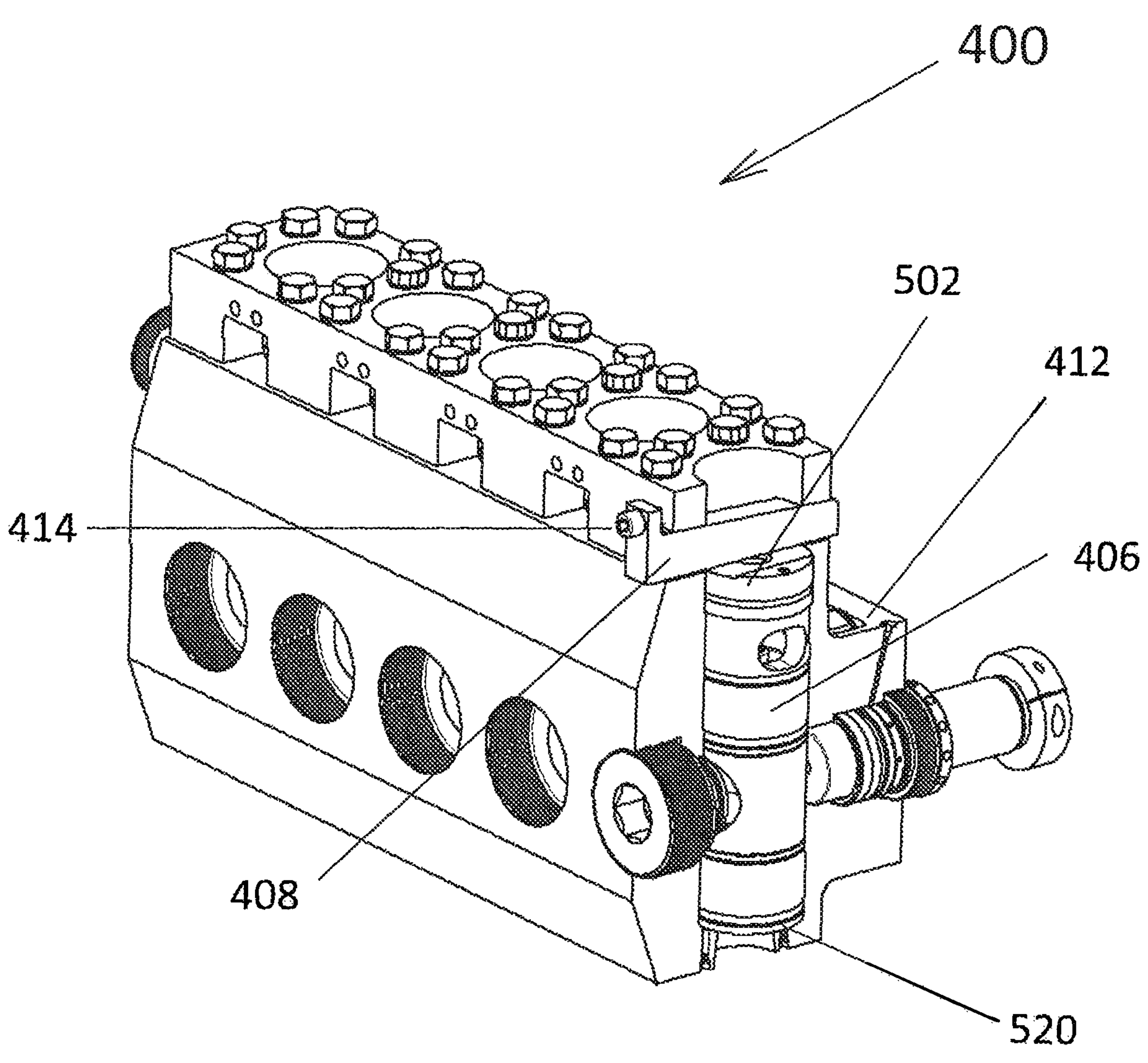
FIG. 6 is a side perspective view of fluid end in one example embodiment of the disclosure with intersecting horizontal and vertical bores.

Referring to FIG. 6, a perspective view of the fluid end 400 block 412 is illustrated with portions of the block 412 removed for illustration clarity. In FIG. 6, during initial assembly the seals 502, 522 are unseated, resulting in the component stack being slightly high. The wedge retention system 408 provides a number of benefits over a conventional screwed nut tightening configuration as discussed below.

In these embodiments, the wedge retention system 408 compresses the component stack (components in FIG. 5) to seat the seals 502, 522 and ensures a metal-to-metal face contact between all components in the stack (resulting in less opportunity for wash-out) wherein the seals provide a pressure seal for the components.

In these embodiments, the wedge retention system 408 provides a mechanical advantage for loading the component stack in compression, which is finally retained by the bolted connection 414 previously described. The bolted connection 414 can be easily torqued, providing a consistent and effective jointing make-up.

The vertical bore 406 extends from the top of the block 412 and houses the components described in relation to FIG. 5. The wedge retention system 408 is illustrated installed with the bolted connection 414, thereby keeping the components within the vertical bore 406.

Figure 7:
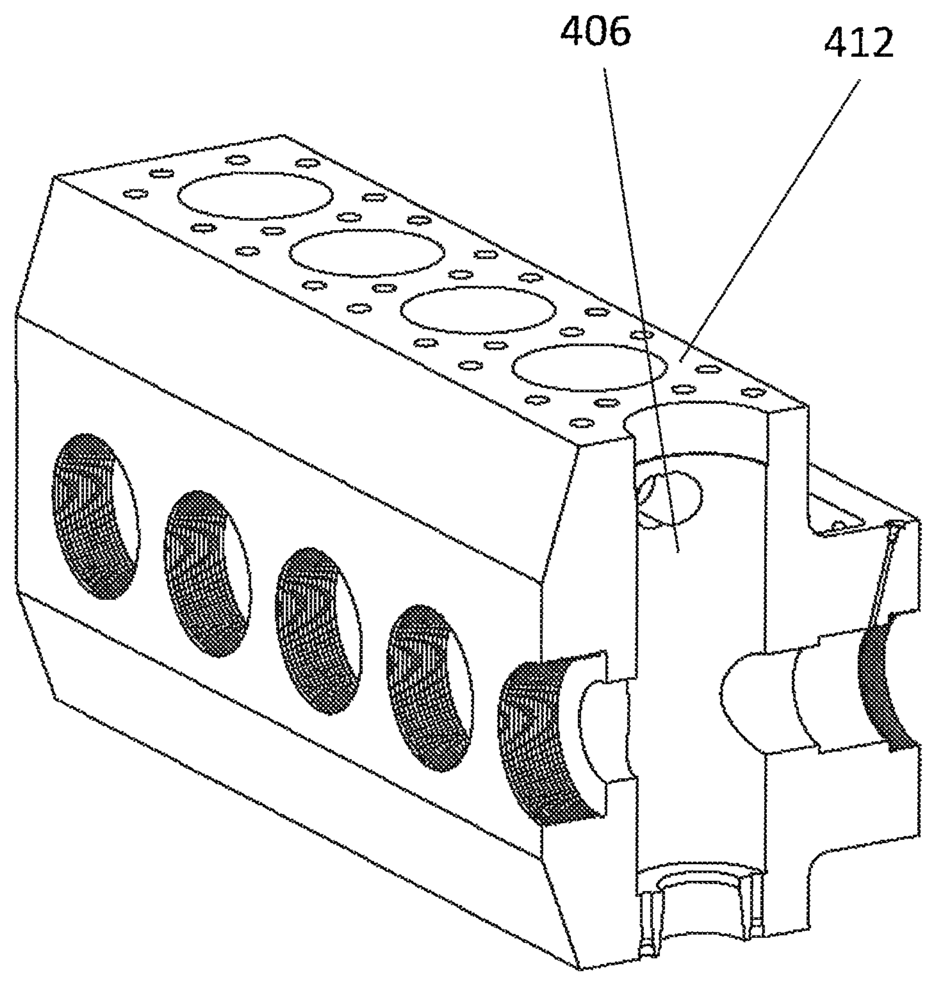
FIG. 7 is a side perspective view of fluid end in one example embodiment of the disclosure with intersecting horizontal and vertical bores with components removed for drawing clarity.

Referring to FIG. 7, a view of a fluid end block 412 is illustrated. To achieve the above assembly method the fluid end block 412 is machined differently from conventional fluid ends. To this end, the fluid end block 412 is created with a simple cylindrical vertical bore 406. With this simplified construction, machining of the fluid end block 412 is more straightforward compared to other conventional systems that require multi-axis machining steps, increasing the overall cost of the system.

The reduced amount of complexity drastic simplifies the machining of the block 412, resulting in reduced cost per fluid end. Further, with the cylindrical bore in relation to the horizontal bore, fatigue stressing is drastically reduced, i.e. less areas of stress concentration (caused by the varying profiled bores in the conventional fluid end). The result is a simpler manufactured fluid end with increased life expectancy and bores which are protected via the check valve component stack, resulting in less potential of fluid end wash-out (a problem with existing fluid ends which generally means having to dispose of the fluid end, replacing it with a new unit).

The fluid end embodiment illustrated is intended as a direct replacement for current style fluid ends, i.e. all the interfaces to the pump power end interface are identical. Utilizing the wedge retention system 408, the bolt connection 414 holding the wedge in place is removed and the wedge extracted (as described in FIG. 4. The flow plug 410 has a central threaded feature to allow connection of an extraction tool (slide hammer). Using an extraction tool, the flow plug 410 is released and removed through the top of the fluid end 400.

In one embodiment, each check valve is configured with 2 tappings within which again allows attachment of an extraction tool. In one embodiment, the upper check valve 402 is simply extracted through the top of the fluid end 400.

In embodiments, tapping features may also be incorporated within the cross piece 418, wherein the extraction tool may be connected and the cross piece 418 extracted from the vertical bore 406. Finally, the lower check valve 404 is extracted in a similar manner to the upper check valve 402 and extracted from the fluid end bore.

Figure 8:
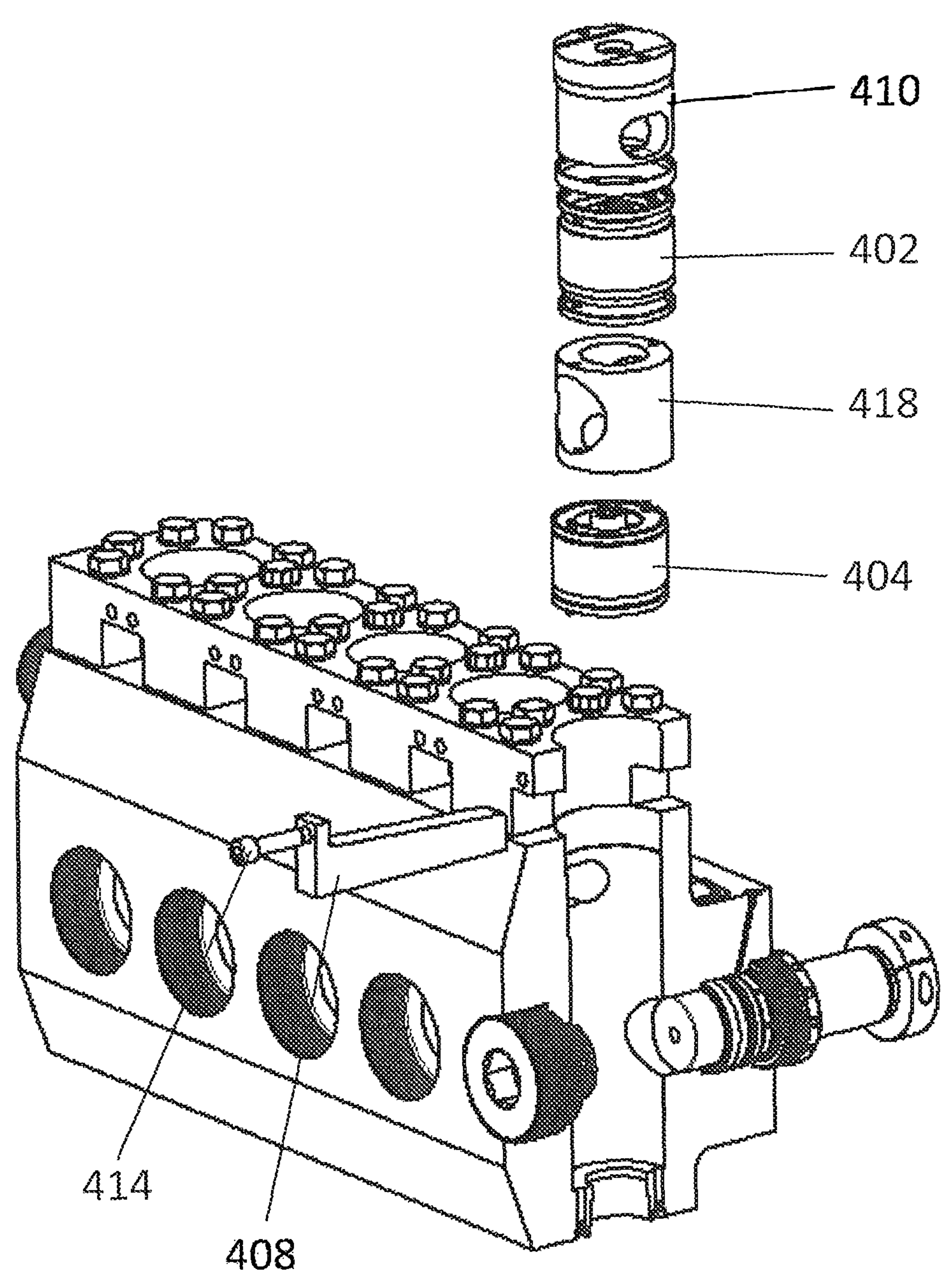
FIG. 8 is a side perspective view of the fluid end of FIG. 3 with exploded components.

Referring to FIG. 8, a typical reassembly procedure is illustrated for the valves of the fluid end 400. In this embodiment, the lower check valve 404 is installed within the vertical bore 406. The cross piece 418 is then installed, followed by the upper check valve 402 and the flow plug 410. The wedge retention system 408 is then installed over the flow plug 410, maintaining all components within a defined orientation.

Figure 9:
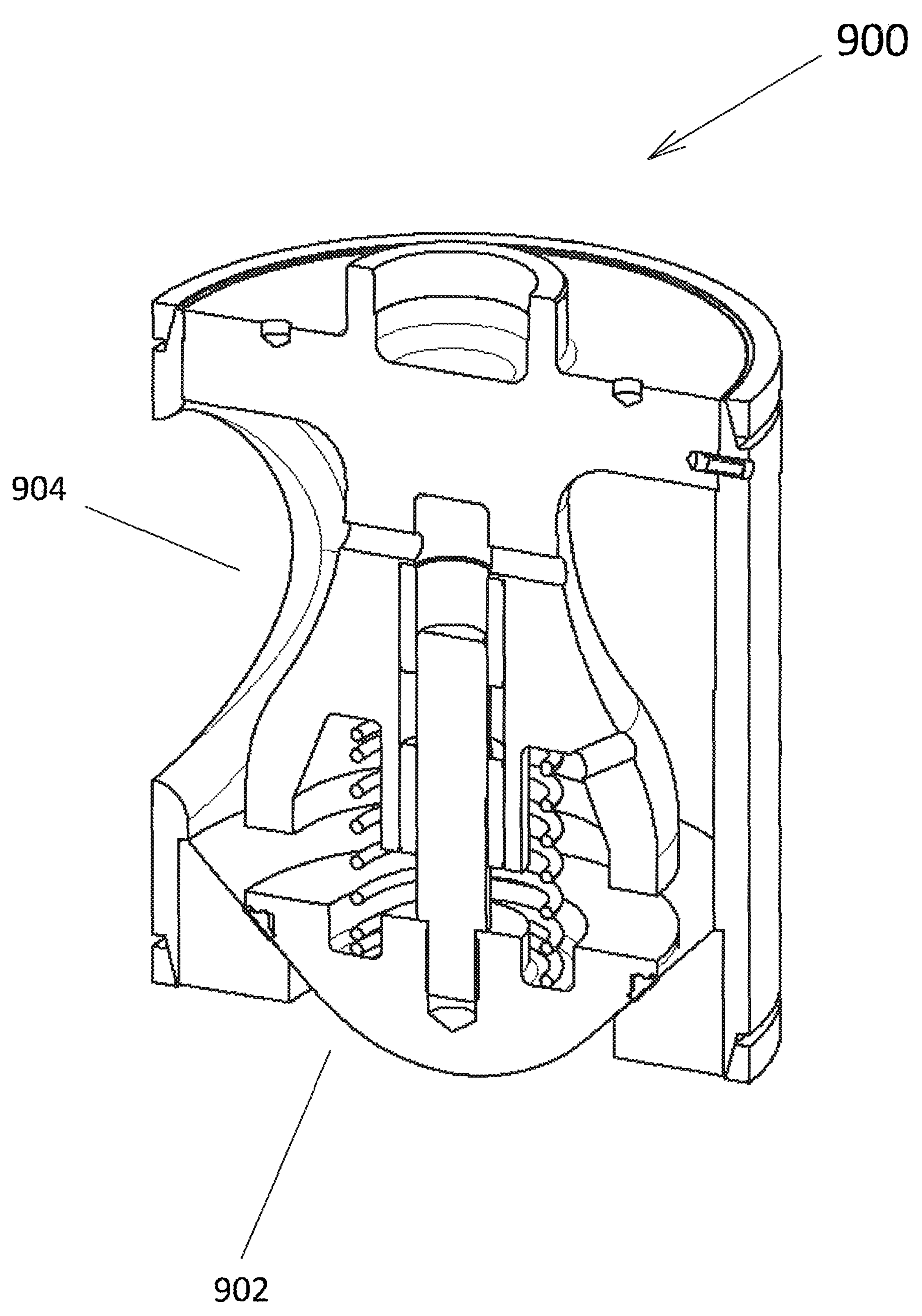
FIG. 9 is a cross-sectional view of a check valve with lower inlet and side ported discharge that may be used in conjunction with the fluid end block of FIG. 3.

Referring to FIG. 9, a further embodiment of a check valve 900 is illustrated. This check valve 900 may be used in the embodiments described above for elements 402 and 404. This check valve 900 provides a lower inlet 902 with a side ported discharge 904 to allow fluid flow through the check valve 900. The components of this check valve 900 are similar as described above.

Figure 10:
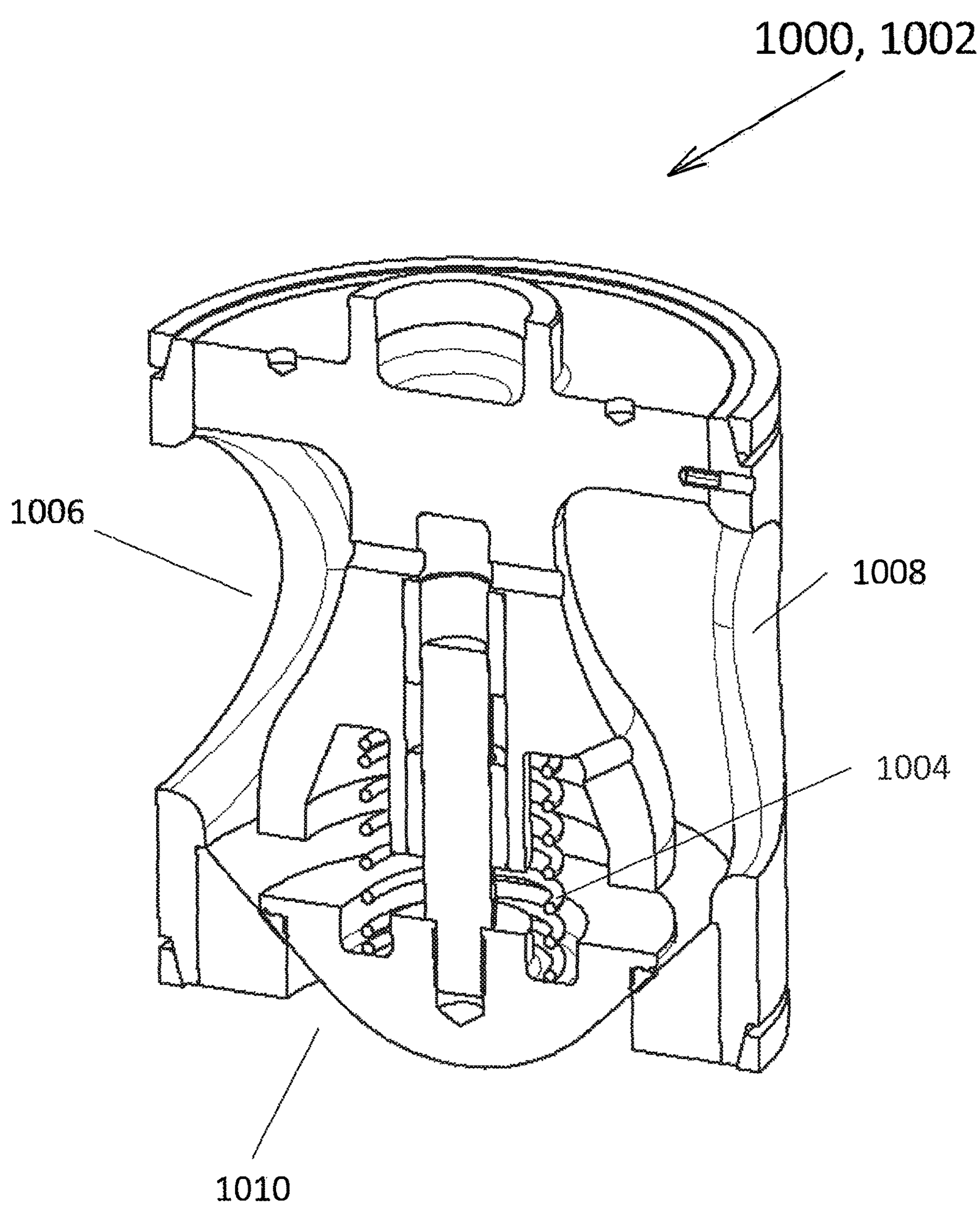
FIG. 10 is a cross-sectional view of a check valve lower inlet with dual ported outlet.

Referring to FIG. 10, a cross-sectional view of a check valve lower inlet with dual ported outlet is illustrated. This check valve 1000 may be used in the embodiments described above with elements 402, 404. The check valve of FIG. 10 is configured as a cartridge type unit that may be installed on a unitary basis. The check valve 1000 may have a discharge 1002 that has dual ports to allow fluid to be discharged. A spring 1004 is used to maintain closure of the check valve 1000 with a specific seating pressure. After exceeding this specific seating pressure, fluid flow may progress through the check valve 1000. Other configurations are possible wherein differing strengths of springs 1004 may be used to open and close the valve at different pressure values. This check valve 1000 provides for dual outlets 1006, 1008 for flow in two directions. The inlet 1010 is provided at the base of the unit.

Aspects of the disclosure provide for many advantages compared to conventional apparatus. In embodiments described herein, the arrangements described provide for a single unit that allows for all check valve components within a single cartridge construction.

Aspects of the disclosure allow for superior service capabilities wherein potential leak paths within check valve arrangements are eliminated compared to conventional arrangements.

Aspects of the disclosure also provide for metal to metal construction which eliminates deformation leak paths common in conventional technology.

Aspects of the disclosure also provide for larger flow path size, thereby reducing restrictions within the flow path. The larger flow path size allows for superior flow performance compared to conventional technology.

The aspects of the disclosure also provide for an arrangement that may be altered to fit field requirements of operations. In some instances, operators may need to have a variable geometry system that will meet the requirements of specific field constraints. Conventional apparatus that are not adaptable cannot perform such functions. Aspects herein can be quickly altered, thereby saving time and field costs for operators.

In embodiments, check valve maintenance may be accessed vertically, Such vertical access allows for easy maintenance for operators, different than conventional apparatus.

In further embodiments, the check valve may be preloaded during installation, ensuring correct make-up loading for pressure resistance.

In further embodiments, check valve seals are provided, as described above. The check valve seals provide additional pressure sealing capability, limiting potential wash-out concerns during service operational pressures and flows.

In further aspects of the disclosure, aspects of the configurations provided provide consistent and repeatable check valve stack loading when utilizing a wedge retention system.

Aspects of the disclosure also provide for superior corrosion potential, thereby reducing seizure of the valves.

In the illustrated embodiments, manufacturing the components is vastly more cost effective than conventional apparatus. Such ease of manufacturing allows for superior price performance and increased economic advantages compared to conventional technology.

Fluid performance for the illustrated embodiments is further vastly superior compared to conventional components. Discharge cross bores may be made with larger sizes compared to conventional apparatus. Such large size cross bores allow for superior flow characteristics, reducing turbulent flow and resulting in less pressure loss.

Fatigue life of the systems illustrated is enhanced compared to conventional apparatus. Cross-intersection stresses are reduced due to larger cross bores, thereby increasing overall fatigue life and enhancing service life. The use of a cross piece further reduces fatigue in the fluid end block by becoming a sacrificial expendable component.

In one example embodiment, an arrangement is disclosed. The arrangement may comprise a block configured with at least one bore. The arrangement may also comprise at least a first check valve and a second check valve inserted into the at least one bore. The arrangement may also comprise a cross piece positioned in the at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block. The arrangement may also comprise a wedge retaining system configured to interface with the block and wherein a bottom of the wedge retaining system is configured to interface with the seal.

In another example embodiment, the arrangement may be configured wherein the wedge retaining system is configured with a bolted connection to connect the wedge retaining system to the block.

In another example embodiment, the arrangement may be configured wherein the bolted connection has two bolts.

In another example embodiment, the arrangement may be configured wherein the piston is configured to reciprocate in an axis different than the at least one bore.

In another example embodiment, the arrangement may be configured wherein at least one of the first check valve and the second check valve is a cartridge design.

In another example embodiment, the arrangement may be configured wherein at least one of the first and second check valve is configured with a hemispherical end.

In another embodiment, a cartridge check valve is disclosed. The cartridge check valve may comprise an outer body defining an inner volume. The check valve may also comprise an outlet configured to interface with at least a portion of the outer body. The cartridge check valve may also comprise a seal configured to interface with the outlet. The cartridge check valve may also comprise a guide stem. The cartridge check valve may also comprise a center core configured within the inner volume of the outer body. The cartridge check valve may also comprise a spring configured to interface with the center core and a valve end configured to interface with the spring; wherein upon a predefined pressure and pressures greater than the predefined pressure, the center core is configured to move within the outer body creating a fluid pathway and wherein the guide stem is configured to extend from the valve end to the center core.

In another example embodiment, the cartridge check valve may further comprise at least two bearings.

In another example embodiment, the cartridge check valve may be configured wherein a first of the at least two bearings is positioned between the valve end and the center core.

In another example embodiment, the cartridge check valve may be configured wherein a second of the at least two bearings is positioned on a side opposite of the center core from the first bearing.

In another example embodiment, the cartridge check valve may be configured wherein the cartridge check valve is made of carbon steel.

In another example embodiment, the cartridge check valve may be configured wherein the valve end is configured in a hemispherical shape.

In another embodiment, an arrangement is disclosed. The arrangement may comprise a block configured with at least one bore. The arrangement may also comprise at least a first check valve and a second check valve inserted into the at least one bore. The arrangement may also comprise a cross piece positioned in the at least one bore positioned between the first check valve and the second check valve. The arrangement may also comprise a bottom seal positioned at one end of the at least one bore and a seal positioned at another end of the at least one bore. The arrangement may also comprise at least one piston configured to reciprocate within the block and a wedge retaining system configured to interface with the block. The arrangement may also be configured wherein a bottom of the wedge retaining system is configured to interface with the seal and wherein at least one of the first check valve and the second check valve comprise an outer body defining an inner volume. The arrangement may also be configured with an outlet configured to interface with at least a portion of the outer body wherein the seal is configured to interface with the outlet. The arrangement may also comprise a guide stem and a center core configured within the inner volume of the outer body. The arrangement may also comprise a spring configured to interface with the center core and a valve end configured to interface with the spring; wherein upon a predefined pressure and pressures greater than the predefined pressure, the center core is configured to move within the outer body creating a fluid pathway and wherein the guide stem is configured to extend from the valve end to the center core.

The arrangement may also be configured wherein the wedge retaining system is configured with a bolted connection to connect the wedge retaining system to the block.

The arrangement may also be configured wherein the piston is configured to reciprocate in an axis different than the at least one bore.

The arrangement may also be configured wherein at least one of the first check valve and the second check valve is a cartridge design.

The arrangement may also be configured wherein at least one of the first and second check valve is configured with a hemispherical end.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways, Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The invention claimed is:

1. An arrangement, comprising:

a block configured with at least one vertical bore;

a component stack, the component stack having:

at least a first check valve and a second check valve inserted into the at least one vertical bore;

a cross piece positioned in the at least one vertical bore positioned between the first check valve and the second check valve, wherein the cross-piece is removeable from above the vertical bore and through the at least one vertical bore;

a lower seal positioned at one end of the at least one vertical bore and an upper seal positioned at another end of the at least one vertical bore; and at least one piston configured to reciprocate within the block; and a wedge retaining system configured to interface with the block and secured to the block with a bolted connection; and wherein a bottom of the wedge retaining system is configured to interface with the upper seal, wherein the wedge retaining system is in a form of an inclined plane that is attached to the block through a mechanical attachment, wherein the mechanical attachment comprises the bolted connection; and wherein the wedge retention system is removably horizontally.

2. The arrangement according to claim 1, wherein the piston is configured to reciprocate in an axis different than the at least one vertical bore.

3. The arrangement according to claim 1, wherein at least one of the first check valve and the second check valve is a cartridge design.

4. The arrangement according to claim 3, wherein at least one of the first and second check valve is configured with a hemispherical end.

5. The arrangement according to claim 1, wherein the vertical bore is cylindrical.

6. The arrangement according to claim 1, where the second check valve is landed on a ledge at a bottom of the vertical bore.

7. An arrangement, comprising:

a block configured with at least one vertical bore and at least one horizontal bore;

a component stack, the component stack having:

at least a first check valve and a second check valve inserted into the at least one vertical bore;

a cross piece positioned in the at least one vertical bore positioned between the first check valve and the second check valve, wherein the cross piece is removable through the at least one vertical bore and in a direction perpendicular to the horizontal bore;

a lower seal positioned at one end of the at least one vertical bore and an upper seal positioned at another end of the at least one vertical bore; and at least one piston configured to reciprocate within the block; and a wedge retaining system configured to interface with the block and wherein a bottom of the wedge retaining system is configured to interface with the upper seal and wherein at least one of the first check valve and the second check valve comprise an outer body defining an inner volume;

wherein the wedge retention system compress the component stack to seat the lower seal and upper seal and form metal-to-metal contact among all components of the component stack;

an outlet configured to interface with at least a portion of the outer body and downstream from the outer body wherein at least one of the upper seal or the lower seal is configured to interface with the outlet;

a guide stem;

a center core configured within the inner volume of the outer body;

a spring configured to interface with a channel in the center core; and a valve end with a channel configured to accept a portion of the spring;

wherein upon a predefined pressure and pressures greater than the predefined pressure, the center core is configured to move within the outer body creating a fluid pathway and wherein the guide stem is configured to extend from the valve end to the center core.

8. The arrangement according to claim 7, wherein the wedge retaining system is configured with a bolted connection to connect the wedge retaining system to the block.

9. The arrangement according to claim 7, wherein the piston is configured to reciprocate in an axis different than the at least one vertical bore.

10. The arrangement according to claim 7, wherein at least one of the first check valve and the second check valve is a cartridge design.

11. The arrangement according to claim 10, wherein at least one of the first and second check valve is configured with a hemispherical end.

12. The arrangement according to claim 7, wherein the vertical bore is cylindrical.

13. The arrangement according to claim 7, wherein the second check valve is landed on a ledge at a bottom of the vertical bore.

14. A cartridge check valve, comprising:

an outer body defining an inner volume;

a fluid outlet configured to interface with at least a portion of the outer body, wherein the fluid outlet is downstream of the outer body;

a seal positioned at least partially around the fluid outlet;

a guide stem;

a center core configured within the inner volume of the outer body, wherein the center core houses a bearing which is positioned at a midpoint of the guide stem;

a spring configured to interface with the center core, wherein the spring is directly connected to a valve end and the bearing is positioned inside the spring; and the valve end configured to interface with the spring; wherein upon a predefined pressure and pressures greater than the predefined pressure, the center core is configured to move within the outer body creating a fluid pathway and wherein the guide stem is configured to extend from the valve end to the center core, the spring further configured to directly interface with a channel in the valve end.

15. The cartridge check valve according to claim 14, wherein the cartridge check valve further comprises a second bearing is positioned on a side opposite of the center core from the bearing.

16. The cartridge check valve according to claim 14, wherein the cartridge check valve is made of carbon steel.

17. The cartridge check valve according to claim 14, wherein the valve end is configured in a hemispherical shape.

* * * * *